Aug. 2, 1966   F. F. LINN   3,263,984
WHEEL SUSPENSION FOR VEHICLES
Filed Nov. 2, 1964   3 Sheets-Sheet 1
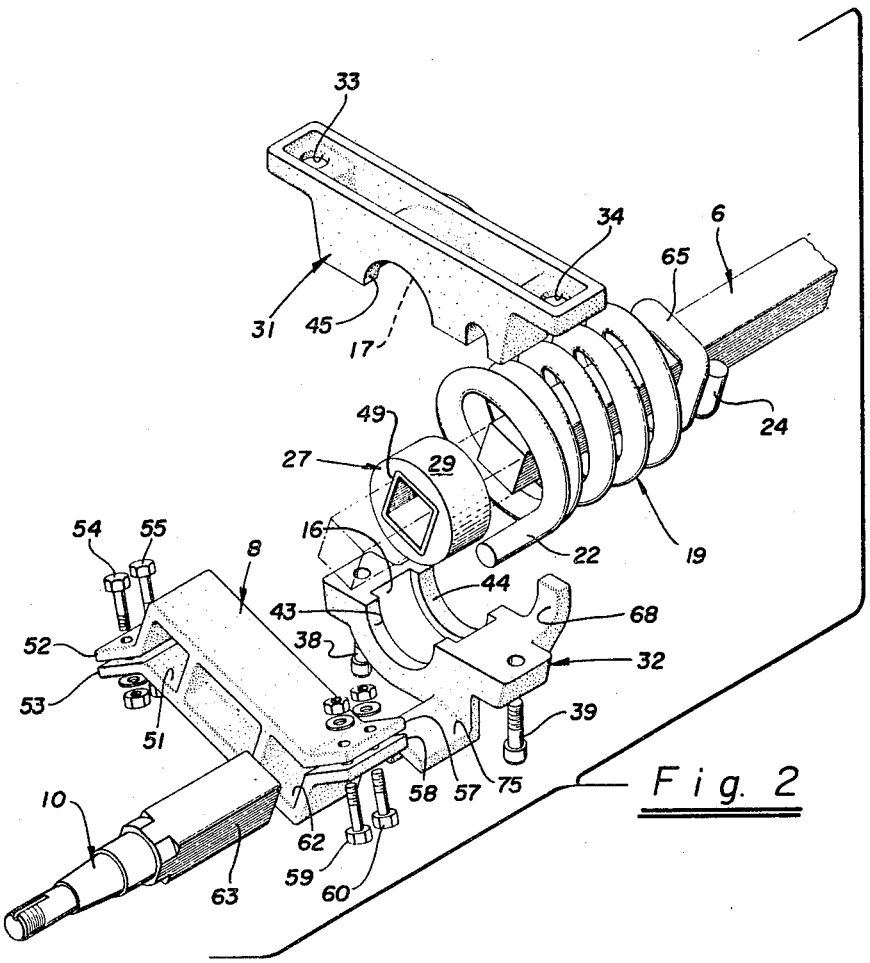
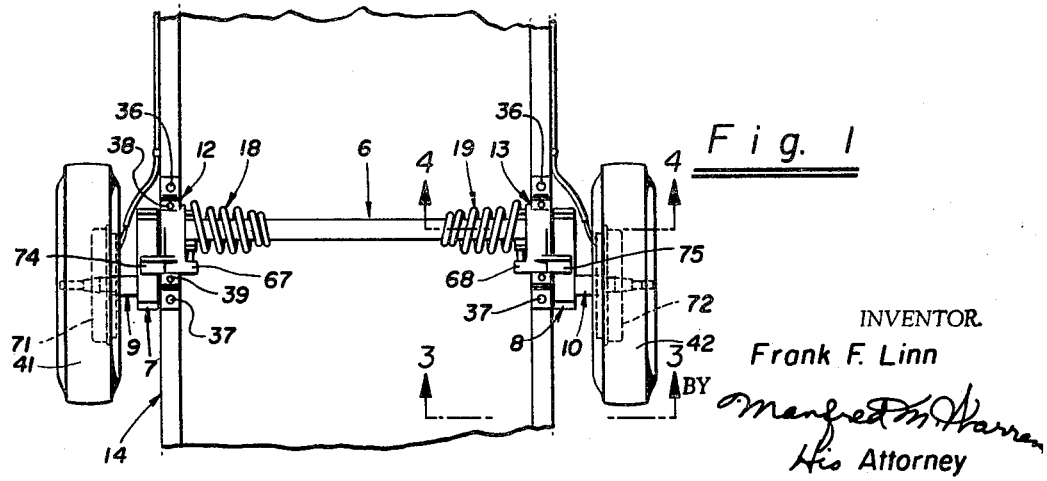
INVENTOR.
Frank F. Linn
BY
His Attorney Aug. 2, 1966  F. F. LINN  3,263,984
WHEEL SUSPENSION FOR VEHICLES
Filed Nov. 2, 1964  3 Sheets-Sheet 2

INVENTOR.
Frank F. Linn
BY
His Attorney

INVENTOR.
Frank F. Linn
BY
His Attorney

United States Patent Office 3,263,984
Patented August 2, 1966

3,263,984
WHEEL SUSPENSION FOR VEHICLES
Frank F. Linn, 2654 Fruitvale Ave., Oakland, Calif.
Filed Nov. 2, 1964, Ser. No. 407,979
6 Claims. (Cl. 267—58)

The invention relates to wheel suspensions and more particularly to improvements in the suspensions of the type described in my earlier Patents No. 2,426,513, filed February 25, 1947; No. 2,445,787, filed September 24, 1945; No. 2,641,464, filed September 26, 1950; No. 2,701,727, filed September 11, 1950; No. 2,784,964, filed January 19, 1953; No. 2,824,734, filed February 25, 1958; No. 2,867,474, filed January 6, 1959.

An object of the present invention is to provide a wheel suspension of the character described which will absorb dynamic shocks in an improved manner and dampen vertical oscillations of the vehicle.

Another object of the present invention is to provide a wheel suspension which may be easily and quickly assembled and disassembled.

A further object of the present invention is to provide a wheel suspension with interchangeable parts in which the wheel may be easily laterally disposed from the vehicle body to provide wheel tracking of varying widths.

Still another object of the present invention is to provide a wheel suspension of the character described which is composed of a minimum number of rapidly formed parts and will give maintenance-free service over an extended period of time.

The invention possesses other objects and features of advantage, some of which of the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings (three sheets):

FIGURE 1 is a plan view of the wheel suspension embodying the features of the present invention.

FIGURE 2 is an exploded perspective view of the wheel suspension.

Figure 8:
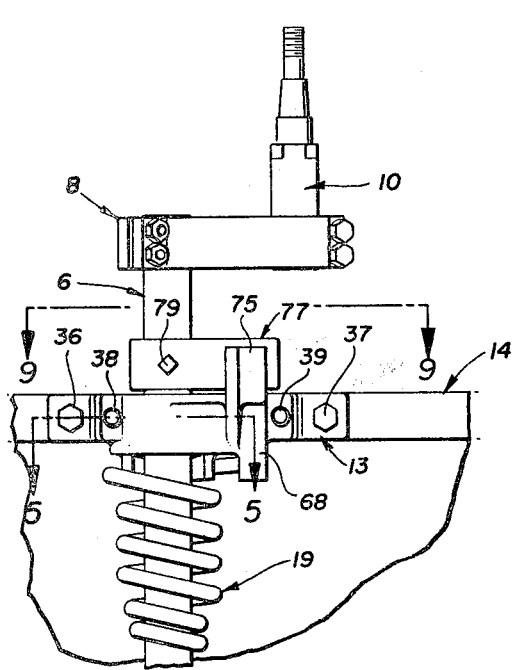
FIGURE 8 is a partial plan view of an alternate form of the invention as shown in an enlarged scale.
Figure 9:
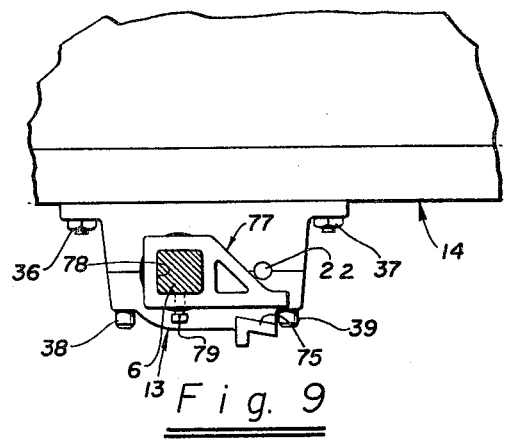
FIGURE 9 is a side elevational view of an alternate form of the invention as viewed along lines 9—9 of FIGURE 8.
Figure 3:
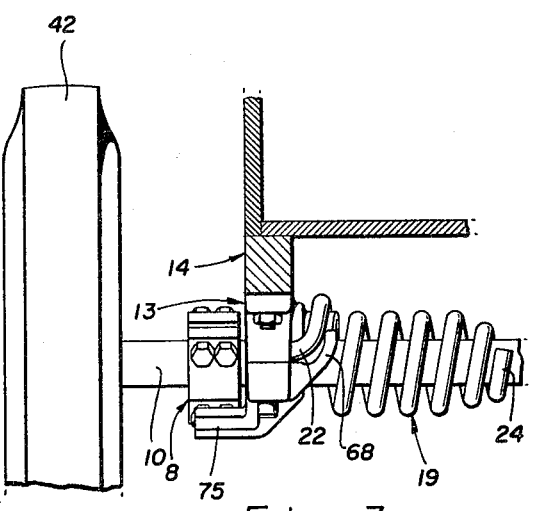
FIGURE 3 is a partial side view of a portion of the wheel suspension with some parts shown in cross-section and taken substantially along the line 3—3 in FIGURE 1 and shown on an enlarged scale.

The wheel suspension of the present invention is useful for one or two-wheeled axles and is here shown and described as a two-wheeled suspension system. The wheel suspension of the present invention therefore consists briefly of a shaft 6; radially projecting arms 7 and 8 mounted on opposite ends of the shaft; wheel spindles 9 and 10 secured to arms 7 and 8 in offset parallel relation to shaft 6; bearing 12 and 13 formed and adapted for connection to a vehicle body 14, and having annular walls 16 and 17 forming bores therethrough, and journalling shaft 6 therein; helical springs 18 and 19 surrounding shaft 6, each having an end 21 and 22 connected to respective bearings 12 and 13 and the other ends 23 and 24 connected to shaft 6; and resiliently distortable means 26 and 27 connected to shaft 6 and having annular peripheral walls 28 and 29 in frictional contact with the respective bearing walls so as to rotate relative thereto under static loading and to grip said walls under dynamic loading to provide resilient torsional coupling between bearings and the axle.

The general features of bearings 12 and 13 are more fully described in my Patent No. 2,426,513, filed February 25, 1947, and preferably are formed in two parts or sections, one section 31, which is the top section in use being provided with means of attachment to the vehicle frame and the bottom or cap section 32 functioning to complete the bearing journal. The upper section 31 may be secured either detachably or permanently to the frame 14 and in the present construction the upper section is provided with bolt holes 33 and 34 adjacent its opposite ends for receipt of bolts 36 and 37 securing the upper bearing section to the vehicle frame 14.

Cap 32 is preferably detachably secured to the base in aligned relation thereto by cap screws 38 and 39. A shaft receiving bore is provided substantially one-half in the base and one-half in the cap, the line of cleavage of the cap and base coinciding approximately with the center line of shaft 6 engaged in the bore. Bearing wall surfaces 16 and 17 may be formed of any suitable wear resistant bearing material.

One of the problems of the type of axle shown in my Patent No. 2,426,513 is the fact that springs 18 and 19 resist torque forces in one direction only. Thus when a bump or obstruction is traversed by a wheel 41 or 42, frame 14 and axle 6 approach each other. After the obstacle is traversed, springs 18 and 19 tend to unwind and to force frame 14 and axle 6 apart. Under these dynamic conditions, the load tends to oscillate or the wheel tends to bounce on the highway surface. In order to dampen these oscillations and also to provide additional torque resistance, a resiliently distortable means 26 and 27 is here provided within the bearings. As here shown, the resilient means 26 and 27 may be of any flexible material such as rubber. The term "rubber" is here used in a general sense and is intended to include natural and synthetic rubber and their mixtures and compounds. Amongst the synthetic rubber compounds that may be used are neoprene and polyurethane. Means 26 and 27 present a wall 16 and 17 which is in close fitting frictional engagement with the bearing wall 16 and 17 as that under static load conditions such as when the load is being placed in the vehicle, a creeping or sliding will take place between the surface of the means and the wall of the bearing and the torque of axle 6 will place a load upon helical springs 18 and 19. Under dynamic conditions such as when an obstruction is hit by one of the wheels 41 or 42, the frictional engagement between the means 26 and 27 and the walls of the bearing 28 and 29 will resist the rotational movement of shaft 6. Furthermore, this anti-rotational force will be exerted upon shaft 6. Thus, means 26 and 27 serve both as a shock absorber or a dampener of the oscillations of the vehicle and as a booster to aid in the resistance of rotational force of axle 6 against spring 18 and 19. There is very little initial compression of member 26 in the present construction. Member 26 may be constructed so that an assembling top section 31 and cap 32, member 27 holds the two sections apart by a gap of about 0.25 inch. This small preloading is primarily to be sure to fill the cavities and irregularities which you may have in a casting, and obtain a uniformity in the end product. Even if the rubber is slightly undersized and no preloading is accomplished, the load on the axle will function to give the rubber a friction or holding capacity under dynamic shock conditions while permitting it to slip under static load conditions. I have found where rubber is used a Shore hardness of about 80 durometer is preferable but for special applications a durometer as low as 60 may be used. I have also found that it is important to provide a glazed bearing surface which is obtained by rolling the finished rubber part in a silicone liquid and then rolling the part in hot paraffin. When the part is mounted in the bearing, the paraffin will fill the pores in the surrounding steel thus providing the glazed bearing surface.

Figure 4:
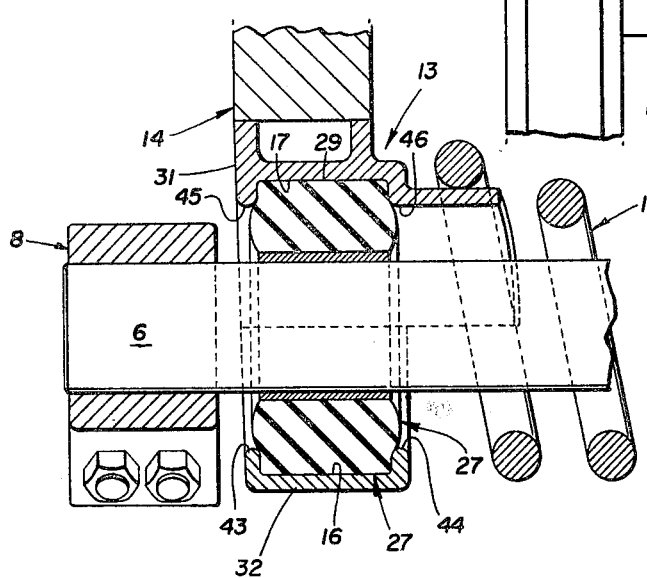
FIGURE 4 is a cross-sectional view of a portion of the wheel suspension taken substantially along the line 4—4 in FIGURE 1 on an enlarged scale.
Figure 5:
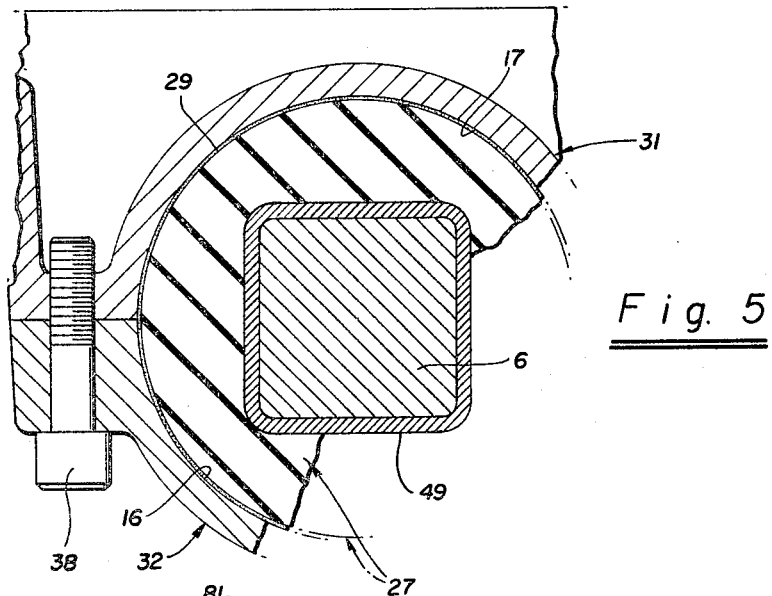
FIGURE 5 is a cross-sectional view of a portion of the wheel suspension with parts broken away taken substantially along the line 5—5 as seen in FIGURE 8 shown on an enlarged scale.

When the resilient means 26 or 27 frictionally grips the walls of the bearing, the resilient means is placed under great torsional stresses which distort the resilient material. The edges of the means thus tend to move out of contact with the bearing surface. As a structural feature of the device, I have provided a recess in the bearing forming edge flanges 43 and 44 and 45 and 46. In order to contain the resilient means 26 and 27 at the face of axle 6, metal retaining sleeves 48 and 49 are bonded to resilient members 26 and 27 respectively. Thus, when the resilient means 27 is distorted as in FIGURE 4, the resilient material will be retained in the bearing.

Another feature of the present wheel suspension device is that it may be easily and quickly assembled or disassembled. As provided herein, shaft 6 is made with a uniform non-circular cross-section such as a square, triangle, etc. The center opening in the resilient means 26 and 27 is formed with the identical cross-sectional configuration as the axle so that the axle may slide through the resilient means. Arm 8 is formed with an opening 51 which is also of the same configuration as axle 6 so that axle 6 may be slidably received therein. Arm 8 is provided with a depending split flange 52 and 53 which is closed by bolts 59 and 60. An opening 62 is provided in arm 8 to slidably receive a shank 63 on spindle 10.

The fact that all of the parts are made with matching openings also enables the wheel suspension to be modified as shown in FIGURE 8 so that where the wheels are used in places where the width of tracking needs to be set, such as on farms, so that the wheels will be received in rows of plants or varying spacing the wheel assembly may be easily varied by inserting axles of different lengths to accommodate the necessary spacing. In order to permit relative sliding of axle 6 and springs 18 and 19, and also to insure rotation of end 24 of the spring with the axle 6, the last turn 64 and 65 of springs 18 and 19 respectively is formed in a square shape or such shape as to conform with the cross-sectional area of axle 6.

An additional feature of the present device in which spring ends 23 and 24 are slidably attached to axle 6 is the fact that axial forces on resilient members 26 and 27 are minimized. Thus it can be understood that if the end 23 of spring 18 is fixed to axle 6 to prevent relative longitudinal movement, the winding and the unwinding of spring 18 would place a longitudinal or axially aligned force on axle 6 which would tend to force resilient member 26 in an axial direction due to the frictional contact between axle 6 and the metal retainer ring 48. Providing a sliding fit between the spring and axle 6 minimizes the axial forces on resilient means 26.

In order to prevent springs 18 and 19 from pulling away from bearings 12 and 13 respectively, lugs 67 and 68 depending from the bearings are positioned in connection with a turn of springs 18 and 19 respectively. In order to provide protection where the vehicle is provided with brakes 71 and 72, brake stops 74 and 75 are provided on bearings 12 and 13 respectively, the operation of which is more fully described in my Patent No. 2,701,727. In order to provide braking where the axle is extended as in FIGURE 8, I have provided an auxiliary arm 77 which is formed with an opening 78 for slidably receiving axle 6 and is attached thereto by a set screw 79 and engages brake stop 75.

In operation, under static load conditions such as where a load is placed vertically on the wheel suspension, the load is transferred through bearing portion 31 to resilient means 26 and 27 which compresses and transfers the force to axle 6 which in turn bears downwardly on arm 7 and transfers the load to spindle 9 and to wheel 41. In like manner the load is transferred to wheel 42. Load on spindles 9 and 10 causes a reverse force which causes arm 7, for example, to rotate in a counterclockwise direction as seen in FIGURE 1 and axle 6 is also rotated so as to place helical spring 18 in torsional stress. As shaft 6 rotates, the rotational force is transferred to resilient means 26 through metal retaining sleeve 48 and face 28 will begin to creep or slide in bearing surface 16. Thus, torsional forces on resilient means 26 will be gradually relaxed.

Under dynamic forces, however, the rotation of axle 6 will occur so rapidly that face 28, for example, will frictionally grip bearing surface 16 so that much of the shock will be absorbed by torsional distortion of resilient means 26. It will be understood that the major resistance to the road shock will be absorbed by the winding of the springs 18 and 19.

Figure 6:
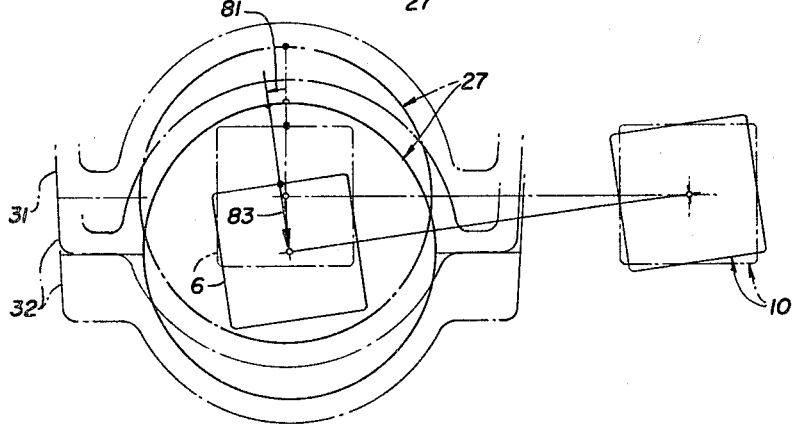
FIGURE 6 is a schematic of the portion of the wheel suspension shown in FIGURE 5 showing movement of the parts in phantom during static loading of the vehicle.
Figure 7:
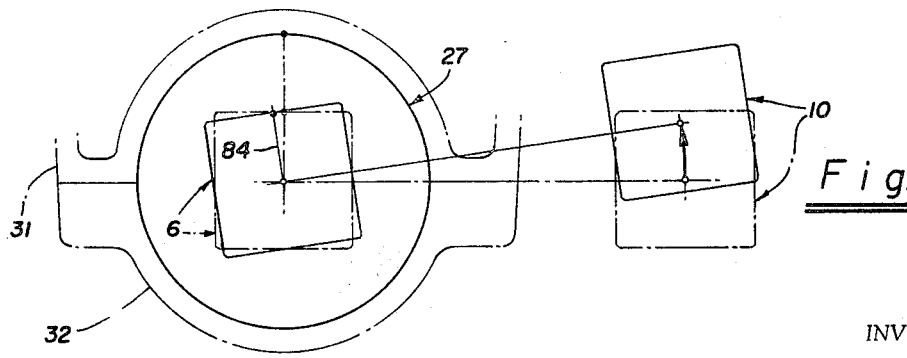
FIGURE 7 is a schematic of the portion of the wheel suspension shown in FIGURE 5 showing the movement of the parts in phantom under dynamic loading.

The action of the resilient member is diagramatically shown in FIGURES 6 and 7. In FIGURE 6 it can be seen that bearing 13 moves dowwardly under static loading and resilient member 27 moves relative to bearing 13 by an angle as designated by arrow 81. In contrast, FIGURE 7 shows that under dynamic loading there is little or no initial relative movement between the resilient member 27 and bearing 13. It is to be noted, however, that under both static and dynamic loading axle 6 rotates the same amount under a given dynamic or static load as designated by arrows 83 and 84, thus placing the helical spring under load.

I claim:
1. A wheel suspension for vehicles comprising a shaft;
   a radially projecting arm mounted on said shaft adjacent an end thereof;
   a wheel spindle secured to said arm in offset parallel relation to said shaft;
   a bearing formed and adapted for connection to a vehicle body, and having an annular wall forming a bore therethrough, and journalling said shaft therein;
   a helical spring surrounding said shaft with one end connected to said bearing and the other end connected to said shaft and;
   a resiliently distortable means connected to said shaft and having an annular peripheral wall in frictional contact with said bearing wall so as to rotate relative thereto under static loading and to grip said wall under dynamic loading to provide resilient torsional coupling between said bearing and axle.
2. A wheel suspension for vehicle comprising a shaft;
   a radially projecting arm mounted on said shaft adjacent an end thereof;
   a wheel spindle secured to said arm in offset parallel relation to said shaft;
   a bearing formed and adapted for connection to a vehicle body, and having a recessed annular wall forming a bore therethrough and journalling said shaft therein, and defining edge flanges;
   a helical spring surrounding said shaft with one end connected to said bearing and the other end connected to said shaft and;
   a resiliently distortable means connected to said shaft and having an annular peripheral wall in frictional contact with said bearing wall between said edge flanges so as to rotate relative thereto under static loading and to grip said wall under dynamic loading to provide resilient torsional coupling between said bearing and axle.

3. A wheel suspension for a vehicle comprising a shaft;
a radially projecting arm mounted on said shaft adjacent an end thereof;
a wheel spindle secured to said arm in offset parallel relation to said shaft;
a bearing formed and adapted for connection to a vehicle body, and having an annular wall forming a bore therethrough, and journalling said shaft therein;
a helical spring surrounding said shaft with one end connected to said bearing and the other end connected to said shaft;
a metal retaining sleeve slidably mounted on said shaft for rotation therewith;
a resiliently distortable means connected to said sleeve and having an annular peripheral wall in frictional contact with said bearing wall so as to rotate relative thereto under static loading and to grip said wall under dynamic loading to provide resilient torsional coupling between said bearing and axle.

4. A wheel suspension for a vehicle comprising a shaft having a non-circular cross section;
a radially projecting arm mounted on said shaft adjacent an end thereof;
a wheel spindle secured to said arm in offset parallel relation to said shaft;
a bearing formed and adapted for connection to a vehicle body, and having an annular wall forming a bore therethrough, and journalling said shaft therein;
a helical spring surrounding said shaft with one end connected to said bearing and the other end formed with a non-circular turn conforming to the cross section of said shaft forming a longitudinal sliding connection to said shaft for rotation therewith;
a resiliently distortable means having a bore formed therethrough for longitudinal sliding receipt of said shaft and connected to said shaft for rotation therewith, and having an annular peripheral wall in frictional contact with said bearing wall so as to move relative thereto under static loading and to grip said wall under dynamic loading to provide resilient torsional coupling between said bearing and axle.

5. A wheel suspension for a vehicle comprising a non-circular shaft;
a radially projecting arm mounted on said shaft adjacent an end thereof;
a wheel spindle secured to said arm in offset parallel relation to said shaft;
a bearing formed and adapted for connection to a vehicle body, and having a recessed annular wall forming a bore therethrough and journalling said shaft therein;
a helical spring surrounding said shaft with one end formed to extend axially thereof at generally right angles to the adjacent spring convolution, said bearing being formed with a socket for receiving said axially extending end to prevent rotation, and the other end formed with a non-circular turn conforming to the cross-section of said shaft and forming a longitudinal sliding connection to said shaft for rotation therewith;
a lug depending from said bearing in connection with a turn of said spring to prevent axial movement of said turn away from said bearing and;
a resiliently distortable means having a bore formed therethrough for longitudinal sliding receipt of said shaft and connected to said shaft for rotation therewith; and having an annular peripheral wall in frictional contact with said bearing so as to move relative thereto under static loading and to grip said wall under dynamic loading to provide resilient torsional coupling between said bearing and axle.

6. A wheel suspension for a vehicle comprising a non-circular shaft;
a radially projecting arm mounted on said shaft adjacent an end thereof;
a wheel spindle secured to said arm in offset parallel relation to said shaft;
a bearing formed and adapted for connection to a vehicle body, and having an annular wall forming a bore therethrough and journalling said shaft therein;
a helical spring surrounding said shaft with one end formed to extend axially thereof at generally right angles to the adjacent spring convolution, said bearing being formed with a socket for receiving said axially extending end to prevent rotation, and the other end formed with a non-circular turn conforming to the cross-section of said shaft and forming a longitudinal sliding connection to said shaft for rotation therewith;
a lug depending from said bearing in connection with a turn of said spring to prevent axial movement of said turn away from said bearing;
a resiliently distortable means having a bore formed therethrough for longitudinal sliding receipt on said shaft and connected to said shaft for rotation therewith and having an annular peripheral wall in frictional contact with said bearing wall so as to move relative thereto under static loading and to grip said wall under dynamic loading to provide resilient torsional coupling between said bearing and axle;
a stop member secured to and extending from said bearing and having a portion positioned to underlie said arm for engagement thereof to prevent a relative rotative displacement of said shaft and arm in a spring unwinding direction; and
an auxiallary arm connected for rotation with said shaft and positioned intermediate to said first named arm and said bearing for engagement with said lug in like manner on said first named arm upon displacement of said first named arm axially of said shaft.

References Cited by the Examiner

UNITED STATES PATENTS

| | | | |
|---|---|---|---|
| 2,426,513 | 8/1947 | Linn | 267—58 |
| 2,455,787 | 12/1948 | Linn | 267—58 |
| 2,740,624 | 4/1956 | Cottrell | 267—58 |
| 2,824,734 | 2/1958 | Linn | 267—57.1 |

BENJAMIN HERSH, *Primary Examiner.*

W. A. MARCONTELL, *Assistant Examiner.*